R. A. SALE.
TOY DUMP CART.
APPLICATION FILED MAR. 15, 1920.

1,364,586.

Patented Jan. 4, 1921.

Inventor:
Robert A. Sale,
By Spear, Middleton, Donaldson & Hall
Attorneys.

UNITED STATES PATENT OFFICE.

ROBERT A. SALE, OF PHILADELPHIA, PENNSYLVANIA.

TOY DUMP-CART.

1,364,586.  Specification of Letters Patent.  Patented Jan. 4, 1921.

Application filed March 15, 1920. Serial No. 365,880.

*To all whom it may concern:*

Be it known that I, ROBERT A. SALE, a citizen of the United States, and resident of Philadelphia, Pennsylvania, have invented certain new and useful Improvements in Toy Dump-Carts, of which the following is a specification.

My invention is a toy dump cart and comprises a set of wheels mounted upon an axle and a body pivotally supported eccentrically, with means for tilting it to dump the contents.

In the drawing—

Figure 1:
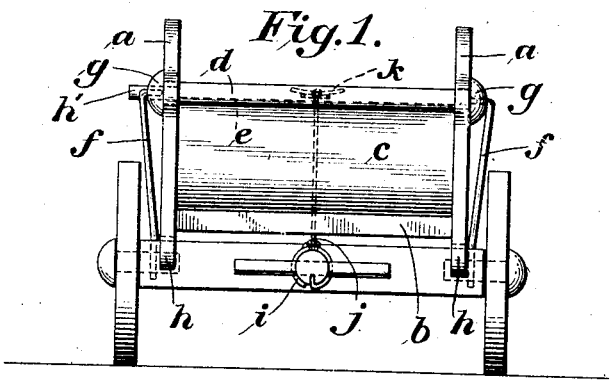
Figure 1 is a front view.
Figure 2:
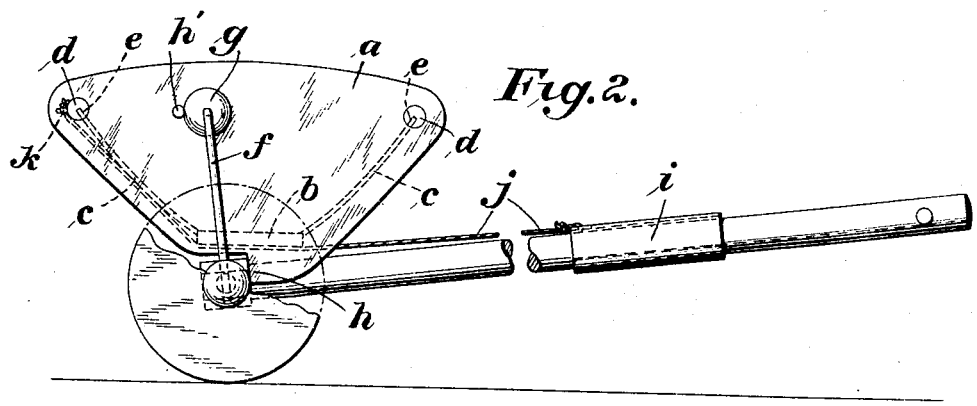
Fig. 2 is a side elevation.
Figure 3:
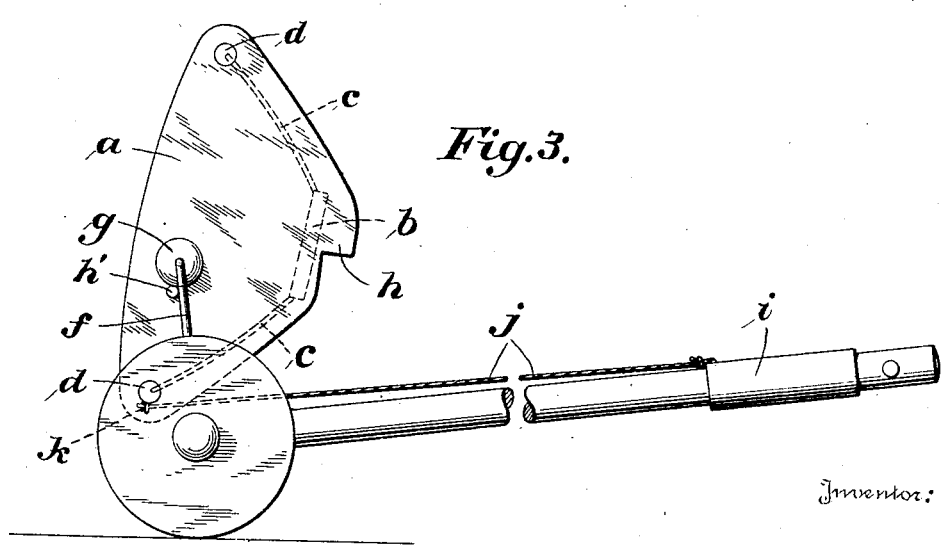
Fig. 3 shows the cart dumped.

Ordinary wheels mounted upon an ordinary axle are utilized with a handle secured to the axle.

The body of the cart is very cheaply and conveniently made by using two side sections "*a*" and bottom section "*b*" and curved front and rear sections "*c*". The sections "*b*" and "*c*" fit snugly against the side walls "*a*" and at the top of the front and rear sections I use wooden rods "*d*" which pass through the side walls and have grooves in their under faces as at "*e*" to engage the upper edges of the front and back sections. No nails of any kind are needed as the parts are held together by a tight fit or by the use of glue. Secured to the axle are two uprights "*f*" which have inwardly bent upper ends having a bearing in projections "*g*" secured to the outer faces of the side walls, whereby the body pivots on the ends and as the bearings for the bent ends are to the rear of the center, the body is held in normal position by gravity. The side walls have projections "*h*" which in normal position bear against the front edge of the axle. One side plate has a projecting pin *h'* which serves as a stop when the cart is dumped. The handle is provided with a sliding section "*i*" and this has a cord "*j*" which passes beneath the cart and connects with a staple "*k*" by a detachable connection so that when it is desired to dump the cart the slide on the handle is moved outwardly which causes the cart to dump. The details of construction of course may be varied over what is shown.

What I claim is—

1. A toy dump cart comprising an axle, wheels and a handle by means of which the cart is propelled and a body eccentrically supported on said axle, with means carried by the handle and connected to said body for tilting or dumping the body, substantially as described.

2. A toy dump cart, comprising an axle, wheels and a handle by means of which the cart is propelled, standards supported from the axle and extending vertically and a body supported by said standards eccentrically of said body, substantially as described.

3. A toy dump cart comprising an axle, wheels and a handle, standards extending from the axle and a body eccentrically supported by said standards and a stop on the body coacting with the standard.

4. A toy dump cart, comprising an axle, wheels and a handle, a body eccentrically supported on said axle, a slide on the handle and a connection between the slide and the rear of the body for dumping the same, substantially as described.

5. In a toy dump cart, a body composed of side, bottom, end and front walls supported upon standards carried by an axle, the sides of the body being provided with projections engaging the axle of the cart, to limit the swinging movement of the body, and means for supporting and dumping the cart, substantially as described.

In testimony whereof I affix my signature.

ROBERT A. SALE.